Sept. 30, 1941.  R. S. THACKER  2,257,203
PROPORTIONAL CONTROL SYSTEM
Filed Jan. 20, 1940  2 Sheets—Sheet 1
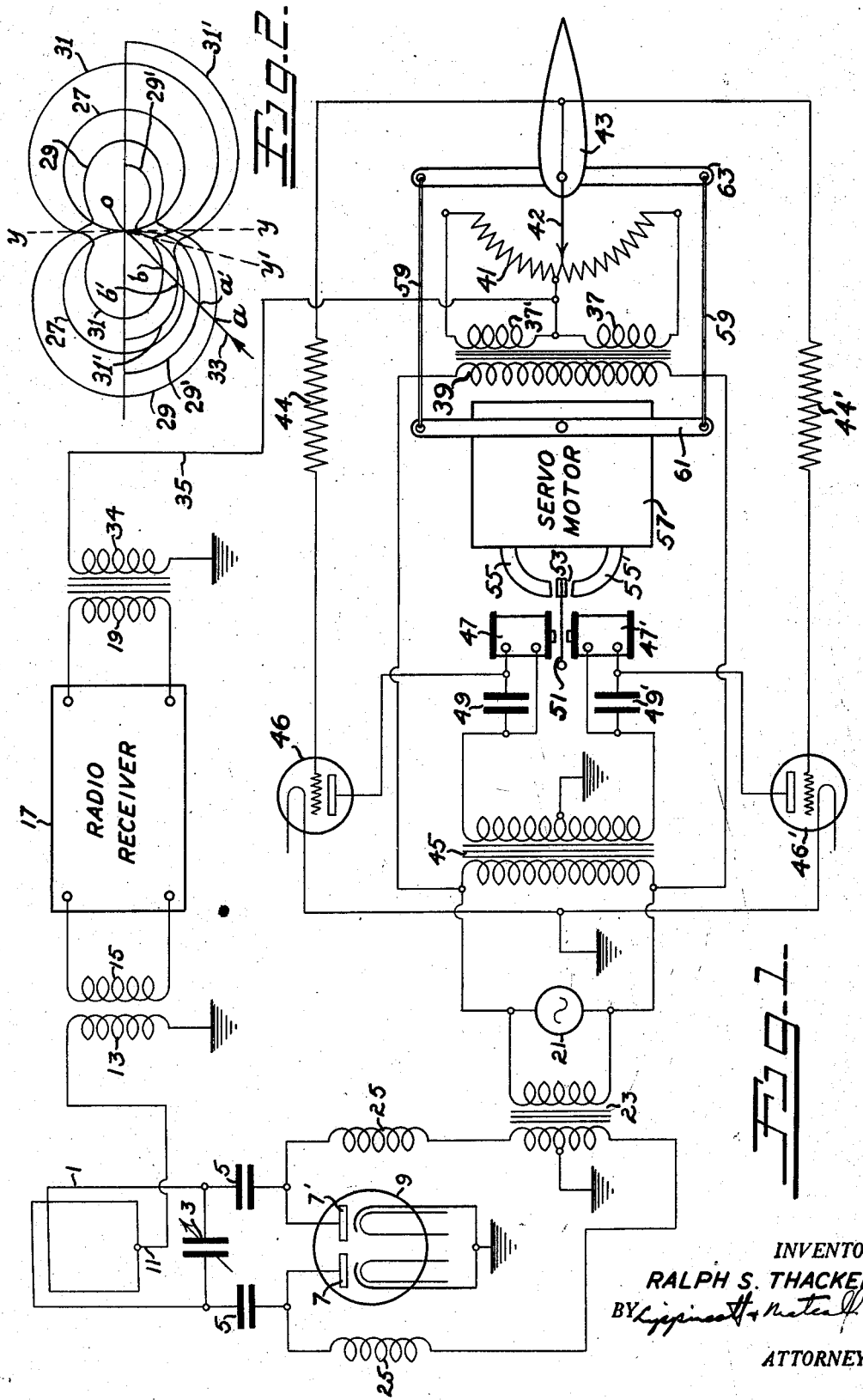
INVENTOR,
RALPH S. THACKER.
BY
ATTORNEYS.

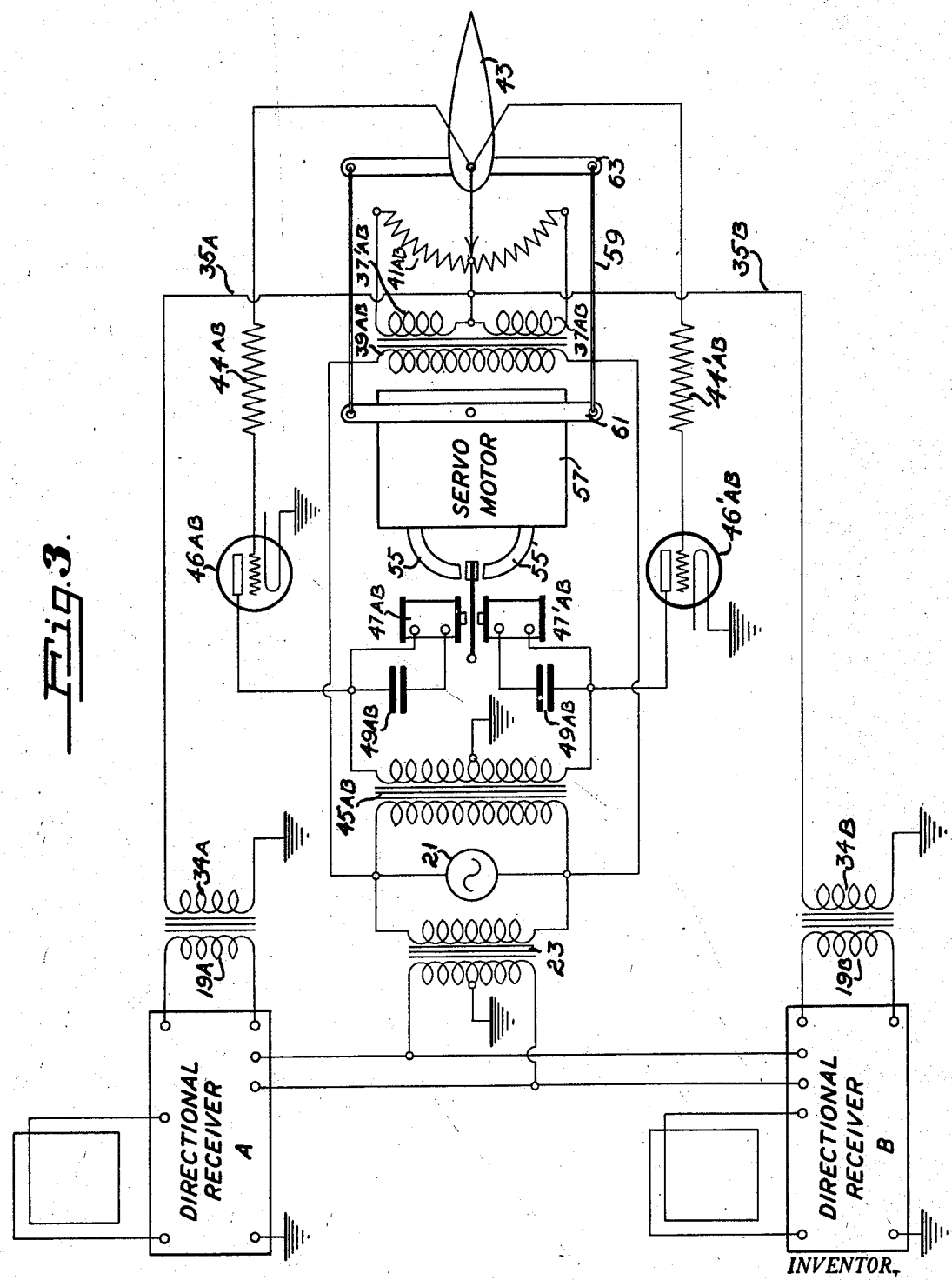

Patented Sept. 30, 1941

2,257,203

UNITED STATES PATENT OFFICE 2,257,203

PROPORTIONAL CONTROL SYSTEM

Ralph S. Thacker, West Los Angeles, Calif., assignor to Leo M. Harvey, La Canada, Calif.

Application January 20, 1940, Serial No. 314,891

10 Claims. (Cl. 250—2)

This invention relates to automatic control systems, and while it is applicable to control systems generally, it is particularly designed for positional control of aircraft in response to radio signals.

Among the objects of the invention are: To provide a control system which will operate in connection with controls of the "off-and-on" type to produce a minimum of over-control; to provide a control system for use with controls of the type specified or with continuously variable controls to vary the degree of control applied so as to decrease the severity or reverse the application as the device controlled approaches the desired condition; to provide a control system which is applicable to all types of control of the "off-and-on" type and particularly to positional controls; to provide a control system which is applicable to any positional control, whether about the longitudinal, vertical, or transverse axis of an aircraft; and to provide a proportional control system which may be utilized in combination with devices of the copending applications, Serial Nos. 325,632 and 314,854, and filed by the present inventor jointly with Ralph W. Goble and Oliver V. Phillips, and by the latter two inventors respectively.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Practically all systems of automatic control operate by causing a deviation from a desired condition to set up an impulse whose tendency is to restore such condition. In practice, either through a lag in response or from the fundamental nature of the restoring forces applied, the result is a deviation of the controlled device from the desired condition in the opposite direction, and when this deviation reaches some definite threshold value a reverse impulse is generated which again tends to restore the condition desired. Control, therefore, is achieved by a succession of alternate deviations in opposite directions from the desired norm. This is true whether the control be the thermostatic control of temperature, the directional control of an airship or plane, or practically any other case where a balance is desired between forces which set up opposite effects.

The present invention is particularly adapted to aircraft control and it will be described specifically in relation thereto but with the proviso that the principles are of general application and that the specific application described is not chosen in a limiting sense but in order to illustrate the principles involved more clearly than would be possible through the use of terms as general as would be warranted by the scope of the invention.

Directional control of all aircraft is achieved by varying the angle of attack of a control surface momentarily so as to set up forces which will realine the aircraft and carry it eventually into a desired position. If we consider the case in which an airplane is off the course desired we move the rudder of the plane to an angle which will shift the axis of the plane and carry it toward the desired course, and then return the rudder to neutral. Changing the angle of the rudder does not, of itself, restore the plane to its course, if we define the direct line between the points of departure and its desired destination as the course, but merely heads it toward the course upon which it may arrive after it has followed its new line of flight for a definite time.

If we define the course as a line in the direction of the destination, irrespective of the position of the point of departure, it still requires a definite time for the plane to obey its rudder and to head in the desired direction.

If the airplane is to be flown under automatic control, it is customary to actuate the rudder by means of some type of servomotor which acts in response to a control impulse to apply the rudder to some definite predetermined degree. This may be done either in a single step, as is the more customary fashion, or it may be done as described in the copending application of Jess S. Morrison, Serial No. 291,478, filed August 14, 1939, by turning the rudder up to its maximum angle of deflection by a series of increments, the number of increments applied being a function of the time during which the control impulse is applied. Any usual type of servomotor, when used in the ordinary manner, results in over-control, so that the airplane follows its course only when such course is considered as the average of a succession of yaws, first to one side of the course and then to the other.

One method of applying the control impulses is by means of a directional radio signal, preferably derived from a radio compass or direction finder of the "right-and-left" indicating type. Such direction finders are customarily comprised of a loop antenna whose geometrical axis constitutes the reference to which the "right-and-left" indications are referred, a deviation of the axis to either side of the direction from which the radio waves are received causing an electrical current to flow which is, in effect, in one direction or the other depending upon the direction of the deviation. If the control be used to maintain the direction in which the plane is headed the same as that from which the radio signal is received, the oppositely acting currents serve to operate a relay which controls the servomotor and thus maintains the general direction of the plane on its course. For this purpose the loop of the radio compass or direction finder (hereinafter referred to generally as "directional radio receiver") is mounted in a fixed position transverse to the longitudinal axis of the plane, i. e., with the axes of the loop and plane parallel.

In general terms, the broad invention consists in the method of automatically maintaining any device in a desired condition which comprises the steps of utilizing a departure from that condition to set up an impulse which causes the movement of a control in such sense as to restore the condition, and causing the movement of the control to decrease the relative intensity of said impulse, and in apparatus for carrying out the method.

In connection with the application of my invention as here specifically described, the invention comprises broadly the step of using the movement of the control equipment to deflect, effectively, the null axis of the receiver in the same direction that the plane is originally off course, with the result that the control impulses will be applied with less and less severity as the desired attitude of the plane is approached (or may even be reversed if this be desirable) and the over-control will thus be reduced to a minimum.

Referring to the drawings:

Fig. 1 is a schematic diagram showing in simplified form the apparatus involving the invention as applied to an automatic directional radio control for an airplane.

Fig. 2 is a polar diagram of the directional characteristic of a receiver of the type illustrated, both when the controls are in neutral position and as modified by movement of the controls.

Fig. 3 is a diagram showing the application of my invention in combination with the radio control system described and claimed in the copending application of Goble and Phillips, Serial No. 314,854, above referred to.

Considering in detail the operation of the embodiment of my invention illustrated in Fig. 1, the control impulse is derived from a directional radio receiver comprising a loop 1 mounted with its axis parallel to the longitudinal axis of the plane. The loop is tuned by a variable condenser 3 to a radio wave transmitted from the destination of the airplane, and the two terminals of the loop are connected through blocking condensers 5, 5 to the two anodes 7, 7' of a double diode rectifier tube 9, the two cathodes of this tube being connected together and grounded. A center tap 11 on the loop also connects to ground through the primary 13 of a radio frequency transformer, whose secondary 15 feeds a radio receiver or detector-amplifier combination 17 of conventional form. This receiver may be of the superheterodyne or tuned radio frequency type or any other sufficiently sensitive radio receiver. The output of the final detector of this receiver supplies the primary coil 19 of an audio-frequency transformer.

The anodes 7, 7' of the tube 9 are excited by alternating potential and current supplied by a source 21 through a transformer 23, the secondary of which is center tapped and grounded, and whose terminals connect to the anodes 7, 7' through radio frequency choke coils 25.

We may express this mathematically by saying that when the loop is receiving a radio signal of frequency $f$ a current whose magnitude is proportional to $A \sin \theta$ ($\sin 2\pi ft$) circulates in the loop circuit. Here A is a coefficient expressing the receiving ability of the loop and $\theta$ is the azimuth of reception with respect to an arbitrarily assumed positive direction along the loop axis. If the loop be unbalanced with respect to ground, i. e., if one end of the loop be nearer to ground potential than the other, there will be added to the current due to the loop effect a current due to the "vertical antenna effect" (hereinafter abbreviated to "antenna effect") which is proportional to $\pm B \sin (2\pi ft + p)$ where B is a reception coefficient depending upon the degree of unbalance of the loop and $p$ is the phase angle of the current due to the antenna effect with reference to that due to the loop effect. The sign of the antenna effect current depends upon which end of the loop is closer to ground potential, and the magnitude of the phase angle $p$ depends upon a number of factors which include the tuning of the loop and the magnitude and nature of the impedance to ground which creates the unbalance. If the coefficients A and B are equal and the angle $p$ is zero the resultant directional pattern will be a cardioid, but in practice this is difficult to achieve. B may be greater than A, which gives a pattern resembling a cardioid in form but tending toward the circular. If the antenna effect be smaller than the loop effect ($A>B$) a two lobed curve results which has clearly defined nulls only in the unusual case where the antenna effect and loop effect currents are exactly in phase, i. e., where $p$ is zero. Curve 29 illustrates a typical form of directional pattern which is provided by grounding one end of the loop. Here the loop effect exceeds the antenna effect, and the angle $p$ is assumed to be 45°, which is reasonably representative of conditions met in practice.

It is well known that the directional characteristic of a loop antenna, such as the loop 1, (if the loop be accurately balanced with respect to ground) is a figure 8 pattern comprising two tangent circles, as is shown by the curve 27 of Fig. 2, i. e., its directional characteristic is a sine curve as shown in polar coordinates, the intensity of the current flowing in the loop being proportional to the sine of the angle of reception with respect to the axis of the loop.

The effect of the alternating potential applied to the anodes of the tube 9 is to ground the two ends of the loop alternately. When one anode, e. g., the anode 7, becomes positive, the path from this anode to its corresponding cathode and ground becomes conductive, while, at the same time, the anode 7' is negative, the path to its corresponding cathode is non-conductive, and the corresponding end of the loop is effectively isolated from ground, giving the directional pattern shown by curve 29. An instant later the polarity of the source 21 reverses, reversing potentials on the anodes 7 and 7' and also reversing the asymmetry of the directional pattern, as is shown by the curve 31 of Fig. 2.

The curves 29 and 31 may be taken to represent the current circulating in the loop circuit, the potential applied to the input tube of the radio receiver, or the average current flowing in the primary 19 of the output transformer of the radio receiver. If the received wave be unmodulated the average output current will be the total output current; if a modulated wave is being received the modulations will be superimposed upon the mean current flowing. If the two curves be considered from the point of view last mentioned, i. e., as representing the primary current in the transformer 19, this current will alternate between the values of the radii-vectors of the two curves when a wave is being received from a given azimuth. For example, if a wave is being received along the line 33, propagated in the direction indicated by the arrow, the current in the transformer primary will be proportional to the intercept o—a on this line, (between the origin and the curve 29) during the time when the anode 7 is positive, and will be proportional to the intercept o—b between the origin and the curve 31, during the period when the anode 7 is negative and the anode 7' positive. Since the current in the primary is unidirectional, its alternating component will be proportional to the difference between the lengths of two intercepts, i. e., proportional to the length of the sector a—b of the radius vector. It will be seen that for a wave arriving along the axis of the coil the intercepts between the two curves and the origin are equal, and there will be no alternating component in the transformer when an unmodulated wave is being received.

One end of the secondary 34 of the output transformer is connected to ground. The other end connects through a lead 35 to the neutral point of the secondary 37, 37' of a transformer whose primary 39 is fed by the source 21. The windings 37, 37' are oppositely wound, and they are connected to the two ends of a potentiometer 41 whose center point also connects to the common point of the secondary windings. The movable contact 42 of the potentiometer is connected to move with the rudder 43 of the plane.

From the potentiometer contact 42 a pair of balanced parallel circuits lead through resistors 44, 44' to the grids 48, 48' of a pair of output tubes 46, 46'. These two tubes may be either high vacuum amplifier tubes as shown, or they may be gaseous conduction tubes of the "grid-glow" type. In either event their plate supply is alternating current supplied by the source 21 through a transformer 45 whose secondary is center-tapped and grounded and whose terminals connect through the opposed relay coils 47, 47' to the output tube plates 50, 50'. By-pass condensers 49, 49' are preferably bridged across the relay windings to assist in the elimination of any components in the receiver output which are derived from the reception of modulated waves.

The coils 47, 47' act in opposition against a common armature 51, which carries upon its end a valve member 53, so that the operation of the relay in either direction serves to close one or the other of a pair of air tubes 55, 55' and thus actuate the servomotor 57, which is connected by suitable linkage members 59, 61, and 63 to actuate the rudder 43 in one direction or the other, depending on which of the air tubes 55, 55' is blocked by the valve.

Considering now the operation of the device, when the rudder and movable contact 42 are in the central or neutral position, the output transformer coil 34 is connected directly to the two grids of the tubes 46, 46' and no effective voltage is applied to these grids from either of the transformer secondaries 37, 37'. If this condition obtains when the plane is off course; for example, if the plane is heading to the left of the course, the signal from the receiver will drive the two grids of the tubes 46, 46' positive at the same instant that the transformer 45 drives the plate of the tube 46 positive and that of the tube 46' negative. The tube 46 will therefore become conductive to an extent which will depend upon the potential of both grid and plate, but the tube 46', carrying a negative plate potential, will remain non-conductive no matter how far positive its grid be driven. The resultant plate current through the tube 46 will excite relay coil 47, attract the armature 51, and so operate the servomotor to swing the rudder 43 to the right and head the plane back towards the course.

The movement of the rudder moves the potentiometer contact 42, and thus upsets the balanced condition of the bridge circuit, and adds to the potential applied to the tubes 46, 46' by the output transformer 34, a voltage which is in opposition to this potential, and whose magnitude depends upon the degree of deflection of the rudder. For small rudder deflections the effect of this opposition potential is merely to reduce the positive potential applied to the grid 46, but continued deflection or reduction of the intensity of the potential derived from the coil 34 will actually reverse the phase of the potentials applied to the tubes 46, 46', so that their grids become positive when the plate of tube 46 is positive and cause the tube 46' to trigger instead of the normal tube 46.

How this occurs may be seen by reference to Fig. 2. The potentials added to the incoming signal by the unbalance of the bridge are always out of phase with the signal, and can be considered as adding a fixed amount to each radius vector of one of the directional patterns, e. g., the pattern 31, giving a new pattern 31', and subtracting a like fixed amount from each radius vector of the other pattern 29, giving a new polar diagram 29'. The resultant amplitude of the signal then becomes the difference between the intercepts of these two new curves on the line representing the direction of reception. In other words, the amplitude of the effective signal along the line 33 of the diagram would be reduced from proportionality with the line ab to proportionality with the shorter line a', b'.

From another point of view, the effect of the added potentials is to shift the null axis of the receiver toward the direction from which the signal is coming, for it will be seen that the curves 29' and 31' no longer intersect on the geometrical axis YY of the diagram, but on a new line Y' which is deflected away from the incoming signal in the direction of the deflection of the plane, so that the apparent deviation from course is less than its actual deviation.

Returning to the operation of the device, the servomotor will therefore act to deflect the rudder only to such a degree as will cause the potential from the source 21 to balance out the impulses from the coil 34, and when this point is reached the relay 47 will return to neutral. If the servomotor be of the type which releases the rudder as soon as the operative impulse ceases, this will permit the rudder to start to swing back to neutral. If the servomotor requires an opposite impulse to bring the rudder back to neutral this opposite impulse will be supplied by the continuation of the ship upon the new course established by the rudder deflection, since the reduction of the signal from the coil 34 will cause the tube 46' to trigger as described above. In either case, as the rudder moves back toward the neutral position, the effect of the potential derived from the coils 37, 37' will decrease, so that the plane approaches a true course asymptotically instead of over-correcting and swinging across the true course. Any disturbance which carries the plane off of the course to the right instead of the left will excite a similar series of operations in the opposite direction.

The whole effect of the device is to swing the null axis of the directional receiver away from the geometrical axis of the plane in the direction of the original deviation from the true course, and any arrangement which will effectively accomplish this deflection of the null axis will meet the requirements of my invention.

In the practical design of the device for any specific application, one of the principal points for consideration is the proportioning of the potentiometer 41. No general rule can be given for this, as it depends on too many factors; the directional characteristic of the loop system, the degree of departure from course to be permitted, the sensitivity of the radio receiver, the magnitude of the potentials applied by the coils 37, 37', and, most important of all and least predictable, the response curve of the plane to rudder deflection.

The loop characteristic is less important than would appear at first glance, for systems of the same general design have characteristics that are very similar, and the various factors which cause even large differences in the shape of the polar diagrams tend to cancel out in one part or the other of the circuits, so that a given change in the voltages applied to tubes 46, 46' will produce very nearly the same shift in angle of the null axis for signals of the same intensity. For example, the curves 29', 31' show the effect of adding an out-of-phase potential of one-half the magnitude of the directional signal as received from the plane of the loop, and this results in a deflection of the null axis of about 12°. This is probably more than would be most desirable in practice, for the device is quite capable of responding to deviations from course of less than 1°.

Sensitivity of the receiver is more important. A weak signal will increase the threshold of the deviation required to actuate the relay. The type of servomotor also has a bearing, depending on whether it always applies a fixed degree of rudder, or a degree which increases with time of application of the control impulse, and upon whether it returns automatically to neutral or is returned to neutral by an opposite impulse.

The control characteristic of the plane enters in connection with the fact that planes vary, and that, while usually their sensitivity to a small increment of rudder deflection increases with increased deflection, this is not always the case.

To meet this latter condition it may be desirable to taper the potentiometer. To meet the others the variable portion of the potentiometer may be limited to a small center section (to limit the shift of the null axis for maximum rudder deflection) and the sensitivity of the receiver may be varied, either by automatic volume control, or manually, as desired. These, however, are engineering matters, quite within the scope of those skilled in the art, and, whatever their detailed solution may be, even if not the best, the operation of the controls will be smoother and more satisfactory than when conventional systems are used.

The invention may be applied in substantially the same manner to operate the ailerons and maintain the plane in trim by means of a signal arriving from a considerable distance to one side or the other of the course, or to operate the vertical rudder or elevator in response to a distant signal arriving from in front or to the rear of the plane, both as described in the copending application previously referred to, and filed by me jointly with Goble and Phillips.

My invention may also be used in only slightly modified form in combination with the type of course control described in the copending application of Goble and Phillips, Serial No. 314,854, above referred to. Such an application of my invention is shown in Fig. 3, wherein each of the two devices bearing the legends "Directional receiver A" and "Directional receiver B" comprises equipment corresponding to that shown in Fig. 1 up to and including the radio receiver 17, and each having an output circuit, including an audio frequency transformer primary 19A, 19B, corresponding with the transformer primary 19 of Fig. 1. The two rectifying diodes of these directional receivers are excited in parallel by the source 21 through the transformer 23. The two secondary coils 34A and 34B of these output transformers are connected in parallel to the center tap of the potentiometer 41AB and the rest of the elements of the device are similar in all respects to the corresponding elements of Fig. 1 and are distinguished by the same reference characters, plus the designation "AB" to indicate that they are responsive to the output of the two directional receivers jointly.

When the device is used in this manner, one of the directional receivers, e. g., receiver A, is tuned to a signal from the destination, while receiver B is tuned to a signal from the point of departure. As described in copending application Serial No. 314,854, above referred to, the two directional receivers are preferably supplied with automatic volume control for maintaining the effects of signals from front and rear substantially uniform.

With this arrangement the correcting impulse maintains the plane, not necessarily headed directly toward the destination, but upon a course which will maintain it upon the direct line between the two stations. The effect of the proportional control herein described is, in this case, to keep the plane much more closely upon the course, i. e., to increase the radius of curvature of the yaws which carry it successively across this line, and to balance the controls eventually with the plane headed into the wind to a degree such that its actual line of flight will be along the desired direct course.

As has before been stated, the particular devices shown are illustrative only; there are many applications of the proportional control herein described and the scope of the invention is limited only as limitations are expressed in the claims.

I claim:

1. In a radio positioning device, automatic control apparatus comprising a directional radio receiver having balanced output tubes the anode current of one or the other whereof preponderates in accordance with the direction of reception of radio waves with respect to the axis of said receiver, relay means operative in opposite senses in response to preponderance of output current in the respective tubes, means actuated by said relay means and movable to effect a change of position of said directional receiver with respect to the received waves, and means actuated by movement of said movable means for changing the point of balance of said tubes.

2. In a radio positioning device, automatic control apparatus comprising a directional radio receiver having balanced output tubes the anode current of one or the other whereof preponderates in accordance with the direction of reception of radio waves with respect to the axis of said receiver, relay means operative in opposite senses in response to preponderance of output current in the respective tubes, means actuated by said relay means and movable to effect a change of position of said directional receiver with respect to the received waves, and a potentiometer having a tap mechanically connected for movement by said last named means and connected to said balanced tubes to vary the input thereof and change the point of balance in response to movement of said last named means.

3. In a radio control apparatus for aircraft, a control surface on said aircraft, mechanical means for moving said surface to alter the attitude of said aircraft, a directional radio receiver having a null axis mounted in a predetermined position with respect to the axis of the aircraft whereabout control is effected by said surface when said aircraft is in its normal flying attitude, means operated coordinately with movement of said surface for varying the position of said null axis with respect to said aircraft axis, and relay means operative in response to output currents delivered by said receiver in response to waves from directions other than along the null axis thereof for actuating said mechanical means.

4. In a radio control apparatus for aircraft a control surface on said aircraft, mechanical means for moving said surface to alter the attitude of said aircraft, a directional radio receiver having a null axis mounted in a predetermined position with respect to the axis of the aircraft whereabout control is effected by said surface when said aircraft is in its normal flying attitude, means operated coordinately with movement of said surface for deflecting said null axis in the same direction as said plane axis will be deflected by the movement of said surface, and relay means operative in response to output currents delivered by said receiver in response to waves from directions other than along the null axis thereof for actuating said mechanical means.

5. The combination with radio control apparatus for vessels having a steering element and comprising a directional antenna, a radio receiver having balanced output tubes, connected for independent excitation, and means for simultaneously reversing the directional characteristic of said antenna and the excitation of said output tubes, of means for supplying a potential alternating synchronously with said reversing means, means responsive to a preponderance of current in one or the other of said output tubes for actuating said steering element, and means responsive to the movement of said steering element for applying said potential to cause a flow of current in opposite phase to the variations of current in the preponderating one of said output tubes.

6. The combination with radio control apparatus for vessels having a steering element and comprising a directional antenna, a radio receiver having balanced output tubes, a source of alternating potential, and means for applying said potential in opposite phases to excite said output tubes alternately and reverse the directional characteristics of said antenna simultaneously with the alternation of excitation of said output tubes, of means responsive to a preponderance of current in one of said output tubes for actuating said steering element, and means responsive to the movement of said element for applying said alternating potential in phase with the potential from said source to oppose the flow of current in the one of said tubes having said preponderance of flow.

7. The combination with radio control apparatus for vessels having a steering element and comprising a directional antenna, a radio receiver having balanced output tubes each having a control electrode, a source of alternating potential, and means for applying said potential in opposite phases to excite said output tubes alternately and reverse the directional characteristics of said antenna simultaneously with the alternation of excitation of said output tubes, of motive means for actuating said steering element, relay means connected in push-pull relationship to said output tubes and operative to actuate said motive means in one or the other direction in accordance with a preponderance of current in one or the other of said output tubes, and means responsive to the movement of said steering element, for applying alternating potential in phase with the potential from said source to the control electrodes of said output tubes in such sense as to oppose current flow in the tube wherein such flow preponderates.

8. The combination with radio control apparatus for vessels having a steering element and comprising a directional antenna, a radio receiver having balanced output tubes each having a control electrode, a source of alternating potential, and means for applying said potential in opposite phases to excite said output tubes alternately and reverse the directional characteristics of said antenna simultaneously with the alternation of excitation of said output tubes, of motive means for actuating said steering element, relay means connected in push-pull relationship to said output tubes and operative to actuate said motive means in one or the other direction in accordance with a preponderance of current in one or the other of said output tubes, a potentiometer having a tap movable in response to movement of said steering element, connections for applying alternating potential in phase with the potential from said source across said potentiometer, and connections from said movable tap to the control electrodes of both of said output tubes, whereby movement of said steering element causes a reduction of the positive potential of both of said tubes in step with the application of positive potential to excite the one of said tubes carrying the preponderating current.

9. The combination with radio control apparatus for vessels having a steering element and comprising a directional antenna, a radio receiver having balanced output tubes each having a plate electrode and a control electrode, of a source of alternating potential connected to supply said plate electrodes in opposite phase and simultaneously to reverse the directional characteristics of said antenna, motive means for said steering element, relay means for actuating said motive means connected in push-pull relationship to the plates of said output tubes to operate said steering element in one or the other direction in accordance with a preponderance of average current in one or the other of said output tubes, a potentiometer having a tap movable in response to movement of said steering element and connected to the control electrodes of both of said tubes, a connection from said radio receiver to the midpoint of said potentiometer, and means for applying a potential across said potentiometer an alternating potential in phase with said first mentioned potential.

10. Radio control apparatus for vessels provided with steering elements comprising a pair of directional radio receivers with neutral axes having a common direction with reference to the axis of the vessel and each adapted to deliver an effective output current which varies in magnitude and sense in direct relation to the magnitude and sense of the angle with respect to its neutral axis from which a radio wave is received thereby, motive means for operating the steering element of the vessel to be controlled, relay means responsive to the algebraic sum of said effective output currents for operating said motive means in one or the other direction in accordance with the sense of said algebraic sum of said output currents, and means for effectively varying the direction of the neutral axis of at least one of said directional receivers in response to the movement of said steering element.

RALPH S. THACKER.